United States Patent
Peli et al.

(10) Patent No.: US 9,562,618 B2
(45) Date of Patent: Feb. 7, 2017

(54) SAFETY DEVICE FOR SELF-PROPULSION GAS SYSTEMS

(71) Applicant: Emer S.p.A., Brescia (IT)

(72) Inventors: Paulo Peli, Brescia (IT); Giorgio de Ruggieri, Turin (IT); Roberto Defilippi, Botticino (IT)

(73) Assignee: Emer S.p.A., Brescia (IT)

( * ) Notice: Subject to any disclaimer, the term of this patent is extended or adjusted under 35 U.S.C. 154(b) by 0 days.

(21) Appl. No.: 14/607,024

(22) Filed: Jan. 27, 2015

(65) Prior Publication Data

US 2015/0159764 A1   Jun. 11, 2015

Related U.S. Application Data

(63) Continuation of application No. PCT/IB2013/056138, filed on Jul. 26, 2013.

(30) Foreign Application Priority Data

Jul. 27, 2012   (IT) .............................. BS2012A0122

(51) Int. Cl.
  *F16K 17/40*   (2006.01)
  *F16K 17/38*   (2006.01)

(52) U.S. Cl.
  CPC ........ *F16K 17/383* (2013.01); *Y10T 137/1797* (2015.04)

(58) Field of Classification Search
  CPC ............. F16K 17/383; Y10T 137/1797; Y10T 137/1804; Y10T 137/1812; Y10T 137/1639; Y10T 137/1963

(Continued)

(56) References Cited

U.S. PATENT DOCUMENTS 4,245,782 A * 1/1981 Brown ................ G05D 23/022
                                                    137/73
4,281,718 A * 8/1981 Claussen ............... F16K 17/383
                                                    169/41

(Continued)

FOREIGN PATENT DOCUMENTS

CN      200965095 Y      10/2007
CN      201461985 U      5/2010

(Continued)

OTHER PUBLICATIONS

International Search Report and Written Opinion of the International Searching Authority issued on Oct. 24, 2013, in connection with International Application No. PCT/IB2013/056138.

(Continued)

*Primary Examiner* — Mary McManmon
*Assistant Examiner* — Minh Le
(74) *Attorney, Agent, or Firm* — Seed IP Law Group LLP

(57) ABSTRACT

A thermal safety device includes a device body with an inlet duct and at least one outlet hole in communication with the atmosphere, a shut-off device mounted in the device body and movable between a closed position and an open position, and a retaining element that keeps the shut-off device in the closed position. The retaining element includes a casing containing a heat sensitive substance configured to expand upon reaching a first predetermined temperature and break the casing and allow the valve to open. A yielding support element provides support for and protects the casing until the temperature reached by the support element is higher than a second predetermined temperature which is higher than the first. The support element is configured to yield upon reaching the second predetermined temperature to place the shut-off device in the open position.

20 Claims, 2 Drawing Sheets

(58) Field of Classification Search
USPC ......... 137/72, 73, 74, 79; 169/72, 89, 37, 42
See application file for complete search history.

(56) References Cited

U.S. PATENT DOCUMENTS

| | | | | |
|---|---|---|---|---|
| 4,293,469 | A * | 10/1981 | Edelman | C08G 2/30 524/195 |
| 4,553,589 | A | 11/1985 | Jennings et al. | |
| 4,827,962 | A * | 5/1989 | Picton | F16K 17/38 122/504.1 |
| 4,981,179 | A * | 1/1991 | Klein | A62C 37/14 169/37 |
| 4,993,496 | A * | 2/1991 | Riedle | A62C 37/14 169/37 |
| 5,010,959 | A * | 4/1991 | Lostoski | A62C 37/14 169/37 |
| 5,109,881 | A | 5/1992 | Baker | |
| 5,318,813 | A * | 6/1994 | Flexman, Jr. | C08L 59/02 428/36.9 |
| 5,494,114 | A * | 2/1996 | Hoening | A62C 37/14 169/37 |
| 5,862,994 | A * | 1/1999 | Pounder | B05B 1/265 169/37 |
| 6,286,536 | B1 * | 9/2001 | Kamp | F16K 17/38 137/68.13 |
| 6,506,850 | B1 * | 1/2003 | Tanimura | C08G 2/00 525/337 |
| 7,766,252 | B2 * | 8/2010 | Jackson | A62C 3/004 137/72 |
| 8,714,180 | B2 * | 5/2014 | Klug | A62C 37/14 137/67 |
| 8,800,588 | B2 * | 8/2014 | Heise | F16K 17/383 137/68.12 |
| 8,910,651 | B2 * | 12/2014 | Heise | G01D 5/12 137/68.13 |
| 2003/0217770 | A1 | 11/2003 | Schultz et al. | |

FOREIGN PATENT DOCUMENTS

| | | | |
|---|---|---|---|
| DE | 19911530 A1 | 9/2000 | |
| EP | 0314577 A2 | 5/1989 | |
| EP | 0590235 A1 | 4/1994 | |
| FR | 2626649 A1 * | 8/1989 | ............. A62C 37/14 |
| GB | 731200 A * | 6/1955 | ............. A62C 37/14 |

OTHER PUBLICATIONS

International Preliminary Report on Patentability issued on Jan. 27, 2015, in connection with International Application No. PCT/IB2013/056138.
Search Report issued by SIPO on Dec. 14, 2015 in connection with co-pending China Application No. 201380038796.3.
Search Report issued by SIPO on May 6, 2016 in connection with co-pending China Application No. 201380038796.3.
EPO machine translation of FR2626649 (cited in Mar. 24, 2016 USPTO Office Action).

* cited by examiner

SAFETY DEVICE FOR SELF-PROPULSION GAS SYSTEMS

CROSS-REFERENCE TO RELATED APPLICATIONS

This application is a continuation of International Application No. PCT/IB2013/056138 having a filing date of Jul. 26, 2013, entitled "Safety Device, In Particular for Self-Propulsion Gas Systems", which is related to and claims priority benefits from Italian patent application No. IT2012BSA000122 filed on Jul. 27, 2012. This application also claims foreign priority benefits from the '122 Italian patent application. The '138 international application is hereby incorporated by reference herein in its entirety.

FIELD OF THE INVENTION

The present invention relates to thermal safety devices. Such devices can be used in self-propulsion gas systems using compressed natural gas, liquefied petroleum gas or other gaseous fuel contained under pressure in a tank and/or container.

BACKGROUND OF THE INVENTION

On vehicles with gas-fuelled engines, the gaseous fuel is loaded and compressed in at least one cylinder or container. According to safety standards in the sector, each gas cylinder in a vehicle is equipped with safety means to prevent, or at least reduce the chance of, an explosion due to an abnormal increase in the internal pressure, the presence of fire and/or a temperature increase beyond a predetermined threshold. Security units are used in association with compressed gas cylinders to prevent excessive temperature increases that lead to increases in the internal pressure of the cylinder.

Known heat safety devices are traditionally placed along a gas venting duct from the cylinder. They typically include a heat sensitive element confined in a respective seat or chamber in a solid body in association with an ejection piston. The heat sensitive element keeps the duct closed unless and until it reaches a predetermined safety temperature threshold upon which it opens the vent for emptying the cylinder.

In certain embodiments, the heat sensitive element is a solid state alloy that melts at the predetermined safety temperature. The element is then pushed, at least partially, outside through an ejection port by the associated piston so as to open the venting duct. In other embodiments, the heat sensitive element is in liquid or paste form and contained in a casing configured to break upon reaching the predetermined temperature.

It is important that the safety devices be reliable and sensitive enough to work properly when impinged by an abnormal rise in temperature.

Several solutions have been developed to increase the reliability and sensitivity of the safety devices. In one method, a small amount of eutectic material is placed in the proximity of the external-environment. Tests have shown that the sensitivity and reliability of the safety device increases as the amount of eutectic material is decreased and the proximity between the eutectic material and the heat source, such as the environment outside the device, increases. One problem with this method is that these devices are difficult to manufacture and assemble. Any mistakes/faults in the manufacturing and/or assembly can adversely affect the operation of the device itself.

In other techniques, device sensitivity is increased by using a liquid heat-sensitive element that is contained in a glass casing configured to break at a predetermined temperature. In these devices, when the predetermined temperature is reached, the casing breaks and the gas is immediately released. Such devices are described in patents German Patent No. 19911530, European Patent No. 0590235 and European Patent No. 0314577.

One problem encountered in the above devices involves the glass casing, which is typically made in the shape of a bulb with a thin elongated neck. This glass casing is known to break for reasons unrelated to the temperature, such as vibrations caused by the operation of the vehicle.

When the glass casing breaks before reaching the predetermined temperature then if and when the predetermined temperature is reached, the safety device fails to work.

Another concern is that the device offers little resistance where the force that the high pressure gas imparts to the piston is great.

There is a need for inexpensive easily manufactured safety devices that reduce the time required for activation. This reduced time makes them both more sensitive and reliable.

SUMMARY OF THE INVENTION

A temperature activated relief device includes a device body with an inlet duct that is in communication with a fluid storage. The device also has at least one exit hole in communication with the atmosphere.

A shut-off device is mounted in the device body. The shut-off device is movable between a closed position and an open position. In the closed position, the shut-off device prevents, or at least reduces, the flow of fluid (such as gas) from the inlet duct to the exit hole. In the open position, the shut-off device permits the flow of fluid from the inlet duct to the exit hole.

The shut-off device can be locked by a retaining element which, upon reaching a first predetermined temperature, opens the shut-off device.

In some embodiments, the retaining element is protected from accidental shocks and vibrations and kept in its seat by a yielding support element. The material of the support element is chosen to protect the shut-off device, keep the retaining element in the specific location, and be drawn from the retaining element if the temperature reaches a second predetermined threshold which is higher than the first predetermined temperature that normally would activate the retaining element.

In short, the yielding support element supports and protects the casing until the support element reaches the second predetermined threshold temperature.

In one embodiment, the device body is assembled by coupling a main portion and a ring nut. The main portion and ring nut define an internal chamber in which the retaining element and the support element are housed and kept in position. The assembly is compact and stable.

In a preferred embodiment, the device body and the inner chamber extend mainly along a longitudinal axis, and the shut-off device is a piston that moves axially along the longitudinal axis between a forward closed position and a retracted open position of the venting duct.

In one embodiment, the retaining element includes a bulb-shaped glass casing with a heat sensitive fluid that is configured to break the casing at the first predetermined temperature. The casing can be sized so that once it is broken, the piston moves into the retracted open position.

The bulb shape can include a hemispherical portion on one end and a neck portion on the opposite side. Preferably the neck portion is protected by the yielding support element which is often in the shape of a bushing. The bushing helps to keep the casing in place during normal use.

The bushing, the glass bulb and the ring nut are sized to allow, in cases where the heat element does not activate, the axial displacement of the glass bulb due to the yield of the mechanical characteristics of the bushing. This allows an axial displacement of the piston by such an extent as to bring it to the retracted open position.

In one embodiment, the piston gate includes a head portion that sealingly engages the inlet duct and a tail portion which partly engages the inner chamber and includes a seat for the hemispherical surface of the glass bulb. At least one outlet hole is formed in the device body or in the ring nut to allow, when the gate is in the open position, the gas to be instantaneously drained from the inlet duct to the outlet holes.

The sensitivity of the relief device described above is very high, as it does not rely on an element of eutectic material that requires complete melting. Moreover, the problem of reliability is also solved. In cases where the heat sensitive element does not activate, for example due to an accidental breaking of the casing neck, the yielding support element loses its mechanical characteristics at a predetermined temperature allowing the bulb and consequently the piston to move to the open position. In some embodiments, the yielding support elements can lose their mechanical characteristics almost instantaneously.

Traditionally upon reaching the predetermined breaking temperature of the bulb, the relief device is activated. If the bulb neck has broken for accidental reasons before reaching the temperature, the bushing of plastic material yields at a higher temperature, allowing the consequent gas escape. In this way, activation of the relief device is certain and in both instances, happens in a very short amount of time.

In some embodiments, the relief device can be used in a tank of pressurized gas, such as for gas cylinders for self-propulsion. In further embodiments the relief device can be used in circumstances where a temperature increase above a certain temperature threshold triggers a safety function. Applications include, but are not limited to, fire protection systems, smoke dischargers, fire dampers, and other heat apparatuses that are thermally actuated in the event of fire.

DETAILED DESCRIPTION OF PREFERRED EMBODIMENT(S)

Figure 1:
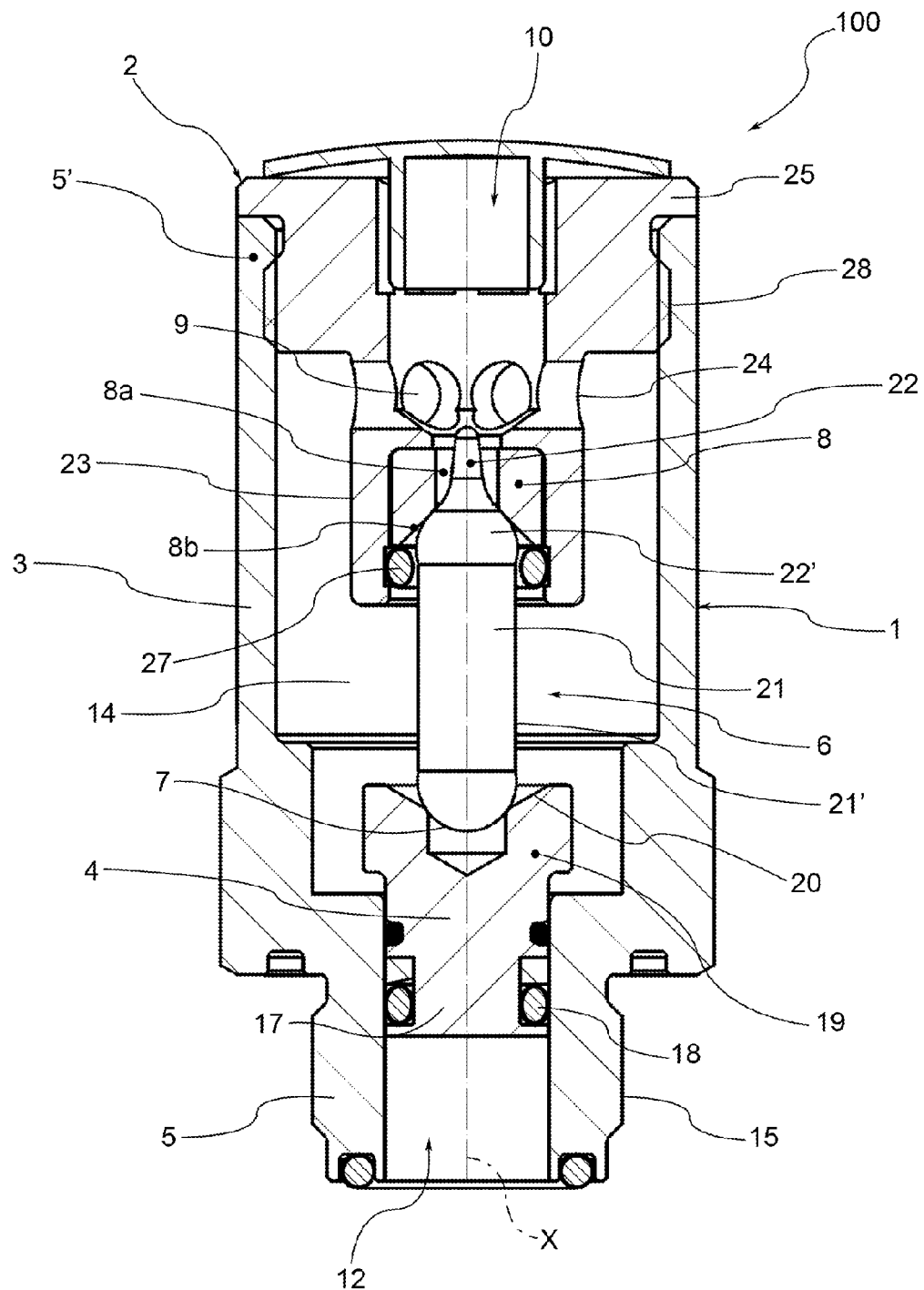
FIG. 1 shows an axial section of a relief device.
Figure 2:
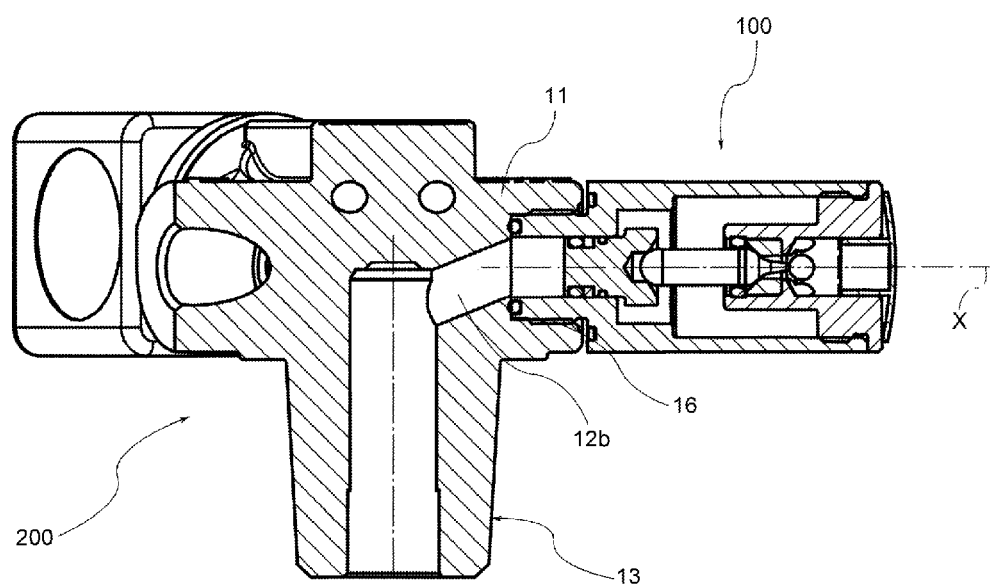
FIG. 2 shows an axial section of the device applied to a valve.

FIGS. 1 and 2 illustrate temperature activated relief device 100 for a pressurized gas cylinder for self-propulsion systems. Relief device 100 has device body 1 which includes main portion 3 that extends along longitudinal axis X of device 100 between first end 5 and second end 5', both open and opposite to one another. Ring nut 2 is positioned to close second end 5'.

Device body 1 and ring nut 2 together delimit inner chamber 14. Inner chamber 14 is in fluid communication with the gas cylinder through inlet duct 12, formed in first end 5 of device body 1. Furthermore, inner chamber 14 is in fluid communication with the atmosphere through at least one outlet hole 9 and/or 10. Therefore, inlet duct 12, inner chamber 14 and at least one outlet hole 9 and/or 10 form, when they are placed in fluid connection with one another, a venting duct to the atmosphere for the gas contained in the cylinder.

In one embodiment, first end 5 of device body 1 is configured to be removably connected to valve body 11 (see FIG. 2). For example, first end 5 of device body 1 has threaded connecting portion 15 which is screwed into threaded seat 16 (see FIG. 2) formed in valve body 11 and in which inlet duct 12 flows.

In some embodiments, inner chamber 14 and inlet duct 12 are coaxial to longitudinal axis X.

A shut-off device, for example piston gate 4, is partially housed in inner chamber 14. Piston gate 4 is movable between a forward closed position, in which it prevents, or at least reduces, the passage of gas from inlet duct 12 to outlet hole 9, and a retracted open position, in which it allows the passage of gas.

In one embodiment, piston gate 4 has head portion 17 which, when gate 4 is in the closed position, sealingly engages inlet duct 12. In one embodiment, head portion 17 has at least one annular seal 18. Head portion 17 of gate 4 can be configured to fit into, and sealingly engage, via seal 18, inlet duct 12.

Piston gate 4 also has tail portion 19, which partially engages inner chamber 14.

A retaining element which works with the shut-off device is housed in chamber 14, preferably arranged coaxially to longitudinal axis X, to keep the shut-off device in the closed position. In FIG. 1 the retaining element is heat sensitive element 6 which includes casing 21 containing a heat sensitive substance configured to expand and brake casing 21 upon reaching a first predetermined temperature. The braking of casing 21 allows the displacement of the valve to the open position. In some embodiments, casing 21 is glass and bulb-shaped with a substantially cylindrical body. Casing 21 can have a first end 7 with a hemispherical shape that fits into seat 20 of tail portion 19 of piston gate 4.

Casing 21 can also have axially elongated neck 22. In some embodiments, neck 22 has a mean diameter less than that of both casing body 21 and base 22' which connects neck 22 to casing body 21.

In the example shown, ring nut 2 includes distal portion 23 (which extends inside inner chamber 14), intermediate portion 24, and head 25 which works with the first opening of device body 1. Distal portion 23 has a substantially hollow cylindrical shape suitable for housing yielding support element 8 which supports casing 21.

As shown in FIG. 1, outlet hole 10, shown extending in the axially direction, is formed in head 25 of ring nut 2, which communicates with inner chamber 14 through at least one outlet hole 9 formed in intermediate portion 24 of ring nut 2, shown extending in the radial direction. In some embodiments, head 25 has externally threaded portion 28 for a threaded coupling with device body 1.

In some embodiments, yielding support element 8 is shaped as a bushing with bushing cavity 8a adapted to accommodate neck 22 of casing 21. On the side facing casing 21, yielding support element 8 has rim 8b which engages casing 21 at least in the axial direction, to lock it in the position in which it is located during the normal operation of the device. In some embodiments, this position is coaxial to longitudinal axis X.

In a preferred embodiment, rim 8b of the bushing rests against base 22' of neck 22 of casing 21 to lock neck 22 in the radial direction. In some embodiments, rim 8b has an inner conical or concave surface that abuts against the surface of base 22'. When base 22' of neck 22 of casing 21 is engaged by rim 8b of bushing 8, neck 22 of casing 21 extends freely within bushing 8.

Yielding support element 8 is configured to yield upon reaching a second predetermined temperature which is higher than the first predetermined temperature. This yielding allows the displacement of the valve to the open position. In some embodiments, yielding support element 8 is made of a plastic material (such as polyoxymethylene (PMO)) with a mechanical resistance that is maintained at a temperature range below the second predefined temperature and decreases upon reaching the second predefined temperature. According to one embodiment, the decrease in the resistance occurs suddenly and drastically.

In particular, the mechanical resistance of the plastic material of yielding support element 8 at the second predefined temperature is lower than the mechanical resistance of the material which casing 21 is composed of at the same temperature. Therefore, upon reaching the second predefined temperature, yielding support element 8 is pierced by casing 21 under the thrust exerted by the gas on shut-off device 4 and thereby on first end 7 of casing 21.

In some embodiments, on the inner surface of distal portion 23 of ring nut 2 an annular seat is formed in which an annular support element is housed. The annular support element (such as seal 27) can be a soft and/or elastic material that surrounds the lateral surface 21' of casing 21 helping to dampen vibrations and/or shocks to neck 22.

A function of bushing 8 and seal 27 is to protect neck 22 of glass bulb 6 by damping the vibrations to which the device is normally subject or due to accidental impacts.

The device prevents a translation of shut-off device 4 from the closed position to the open position, thanks to the contrast action carried out by heat sensitive element 6, in turn kept in the contrast position by yielding support element 8.

When the temperature within relief device 100 increases up to more than a first predetermined threshold (in some embodiments 110° C.), the heat sensitive fluid within casing 21 expands to break casing 21. Shut-off device 4 is then free to retract under the thrust due to the gas pressure inside the cylinder. Inlet duct 12 is placed in fluid communication with inner chamber 14 for the discharge of gas through outlet holes 9. The portion of inner chamber 14 anteriorly delimited by tail portion 19 of the piston gate is placed in fluid communication with the exterior through venting holes 9, so that the portion of the inner chamber is at atmospheric pressure and thus does not oppose the thrust generated in the opposite direction by the gas.

If second end 22 of heat sensitive element 6 breaks during the normal operation of the device, if the temperature within relief device 100 reaches, after the breakage, a first predetermined threshold, casing 21 would remain intact as the heat sensitive substance can flow freely from the casing through the broken end. Shut-off device 4 would thus remain locked in the closed position of inlet duct 12, preventing gas from leaking out of the device, with consequent safety hazards. To alleviate this potential problem, yielding support element 8 allows an axial displacement of heat sensitive element 6 upon reaching a second predetermined threshold temperature (in some embodiments 130° C.). In some embodiments yielding support element 8 is made of a plastic material such that, at the second predetermined threshold, the resistance characteristics of the material degrade in a sudden manner and up to a level such that glass casing 21, under the thrust due to the gas pressure inside the cylinder, leaks from the plastic material moving in the axial direction and freeing in turn shut-off device 4, which retracts opening inlet duct 12.

In brief, yielding support element 8 is made in such a way as to:

(a) dampen vibrations and shocks thus protecting the neck 22 of casing 21 from undesired breakage;

(b) keep casing 21 in its normal operating position, even in the case of high force values exerted on shut-off device 4; and (c) yield, from the mechanical strength point of view, upon reaching a predetermined temperature that is higher than the activation temperature of the heat sensitive element, so as to be overcome by the axial thrust exerted thereon by casing 21.

While particular elements, embodiments and applications of the present invention have been shown and described, it will be understood, that the invention is not limited thereto since modifications can be made without departing from the scope of the present disclosure, particularly in light of the foregoing teachings.

What is claimed is:

1. A thermal safety device comprising:
   (a) a device body which comprises an inlet duct in communication with a fluid storage and at least one outlet hole in communication with an atmosphere;
   (b) a shut-off device mounted in said device body and movable between a closed position, in which it prevents a flow of gas from the inlet duct to an outlet hole, and an open position, in which it permits a flow of fluid from the inlet duct to the outlet hole;
   (c) a retaining element operatively associated to said shut-off device to keep said shut-off device in a closed position, said retaining element comprising a casing containing a heat sensitive substance suitable for expanding upon reaching a first predefined temperature to make such casing break and permit a shifting of the shut-off device to the open position;
   (d) a yielding support element directly contacts with and suitable for supporting said casing and protecting at least a portion of said casing while a temperature reached by said support element is below a second predefined temperature higher than the first, said support element being made of a material suitable to yield upon reaching said second predefined temperature, so as to allow movement of the shut-off device to the open position.

2. The thermal safety device of claim 1, wherein the material of said yielding support element is a plastic material having a mechanical resistance which is maintained at a temperature range below said second predefined temperature and decreases upon reaching said second predefined temperature.

3. The thermal safety device of claim 2, wherein the mechanical resistance of the plastic material of said yielding support element at said second predefined temperature is lower than a mechanical resistance of a material which the casing is composed of at a same temperature.

4. The thermal safety device of claim 3, wherein the casing extends mainly along a casing axis between a first end, which engages said shut-off device, and a second end, opposite the first end, engaged by said yielding support element.

5. The thermal safety device of claim 4, wherein, upon reaching said second predefined temperature, said yielding support element allows itself to be pierced by the casing under a thrust exerted by the fluid on the shut-off device and thereby on the first end of the casing.

6. The thermal safety device of claim 5, wherein the casing has a bulb shape, with a substantially cylindrical casing body and a neck which forms the second end, said neck having a smaller mean diameter than that of the casing body and having a base connecting to said casing body, and wherein the yielding support element is in a shape of a bushing with an inner cavity housing said neck which extends freely therein and a rim which engages said base of the neck.

7. The thermal safety device of claim 1, wherein said yielding support element is housed in a respective seat made in the device body.

8. The thermal safety device of claim 1, wherein an inner chamber extends mainly along a longitudinal device axis and wherein the shut-off device is a piston gate axially movable along said longitudinal axis between the closed position and the open position.

9. The thermal safety device of claim 1, wherein the shut-off device and the yielding support element are coaxial to each other along a longitudinal device axis, the shut-off device and the retaining element being axially movable in relation to said longitudinal axis.

10. The thermal safety device of claim 1, wherein said casing is made of a glass material.

11. The thermal safety device of claim 2, wherein said plastic material of said yielding support element is polyoxymethylene.

12. The thermal safety device of claim 1, wherein said device is used for relieving pressure in a pressurized gas tank.

13. A thermal safety device comprising:
(a) a device body which comprises an inlet duct in communication with a fluid storage and at least one outlet hole in communication with an atmosphere;
(b) a shut-off device mounted in said device body and movable between a closed position, in which it prevents a flow of gas from the inlet duct to an outlet hole, and an open position, in which it permits a flow of fluid from the inlet duct to the outlet hole;
(c) a retaining element operatively associated to said shut-off device to keep said shut-off device in a closed position, said retaining element comprising a casing containing a heat sensitive substance suitable for expanding upon reaching a first predefined temperature to make such casing break and permit a shifting of the shut-off device to the open position;
(d) a yielding support element directly contacts with and suitable for supporting said casing and protecting at least a portion of said casing while a temperature reached by said support element is below a second predefined temperature higher than the first, said support element being made of a material suitable to yield upon reaching said second predefined temperature, so as to allow movement of the shut-off device to the open position; and wherein the casing extends mainly along a casing axis between a first end, which engages said shut-off device, and a second end, opposite the first end, engaged by said yielding support element.

14. The thermal safety device of claim 13, wherein the material of said yielding support element is a plastic material having a mechanical resistance which is maintained at a temperature range below said second predefined temperature and decreases upon reaching said second predefined temperature.

15. The thermal safety device of claim 14, wherein the mechanical resistance of the plastic material of said yielding support element at said second predefined temperature is lower than a mechanical resistance of a material which the casing is composed of at a same temperature and said yielding support element is housed in a respective seat made in the device body.

16. The thermal safety device of claim 13, wherein, upon reaching said second predefined temperature, said yielding support element allows itself to be pierced by the casing under a thrust exerted by the fluid on the shut-off device and thereby on the first end of the casing.

17. The thermal safety device of claim 13, wherein the casing has a bulb shape, with a substantially cylindrical casing body and a neck which forms the second end, said neck having a smaller mean diameter than that of the casing body and having a base connecting to said body, and wherein the yielding support element is in a shape of a bushing with an inner cavity housing said neck which extends freely therein and a rim which engages said base of the neck.

18. The thermal safety device of claim 13, wherein an inner chamber extends mainly along a longitudinal device axis and wherein the shut-off device is a piston gate axially movable along said longitudinal axis between the closed position and the open position.

19. The thermal safety device of claim 13, wherein the shut-off device and the yielding support element are coaxial to each other along a longitudinal device axis, the shut-off device and the retaining element being axially movable in relation to said longitudinal axis.

20. The thermal safety device claim 14, wherein said thermal safety device is used for relieving pressure in a pressurized gas tank and said casing is made of a glass material and said plastic material of said yielding support element is polyoxymethylene.

* * * * *